E. C. MEIER.
CONVERTIBLE BOILER.
APPLICATION FILED APR. 25, 1917

1,304,499

Patented May 20, 1919.
12 SHEETS—SHEET 1.

Witnesses
K. Harwood.
C. R. Ziegler.

Inventor
Edward C. Meier.
By Joshua R. H. Potts
His Attorney

E. C. MEIER.
CONVERTIBLE BOILER.
APPLICATION FILED APR. 25, 1917.
1,304,499.
Patented May 20, 1919.
12 SHEETS—SHEET 2.
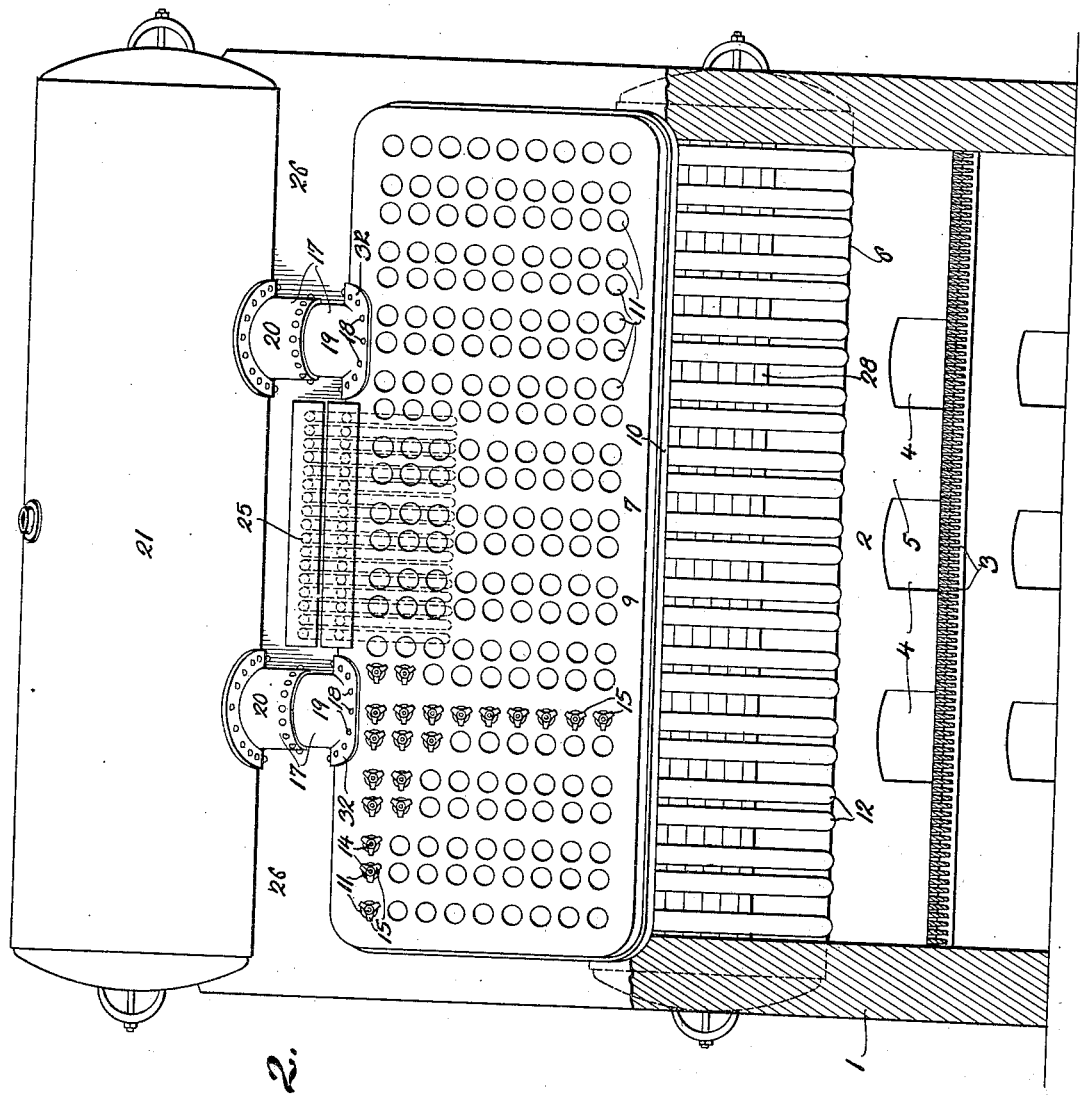

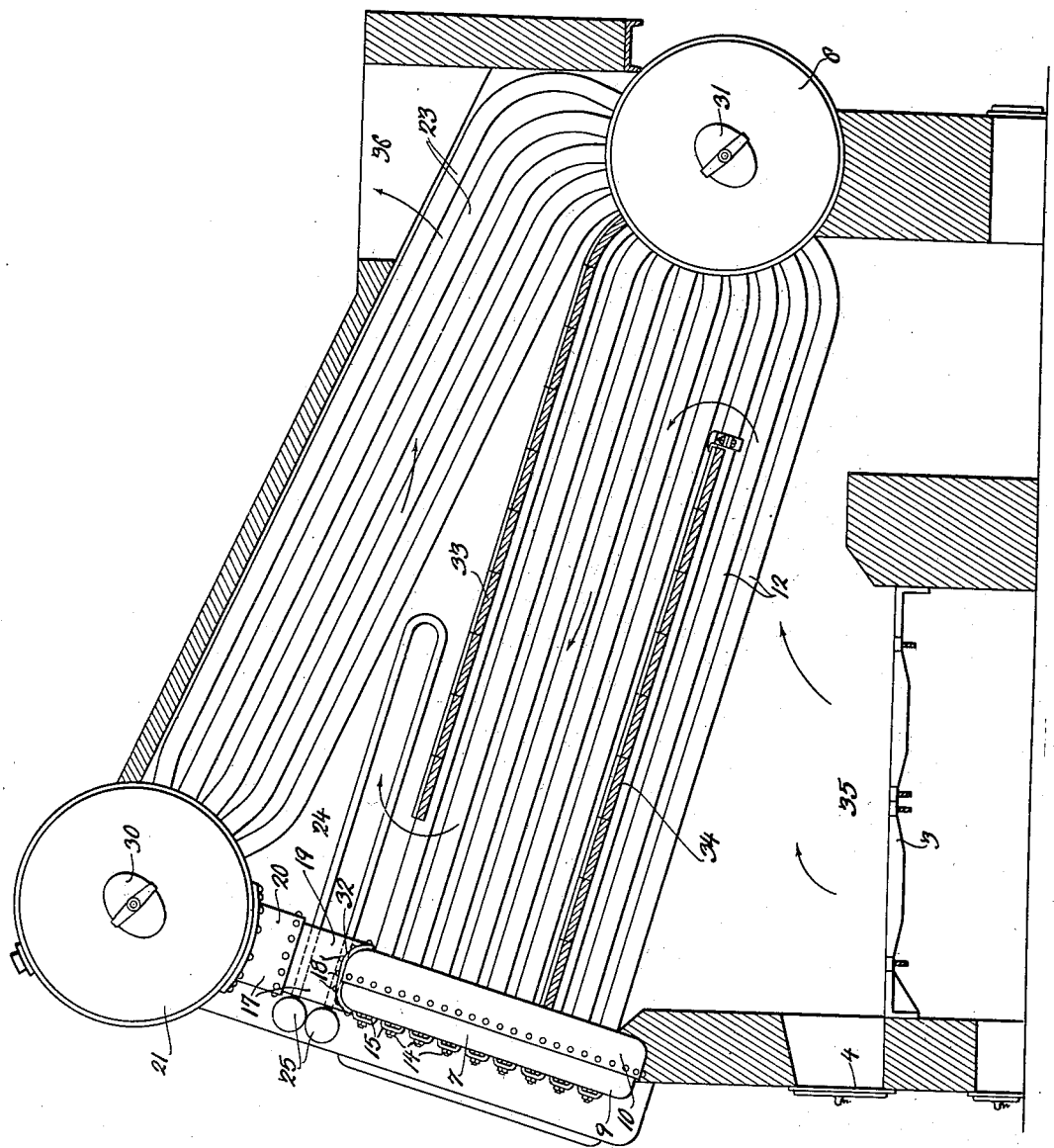

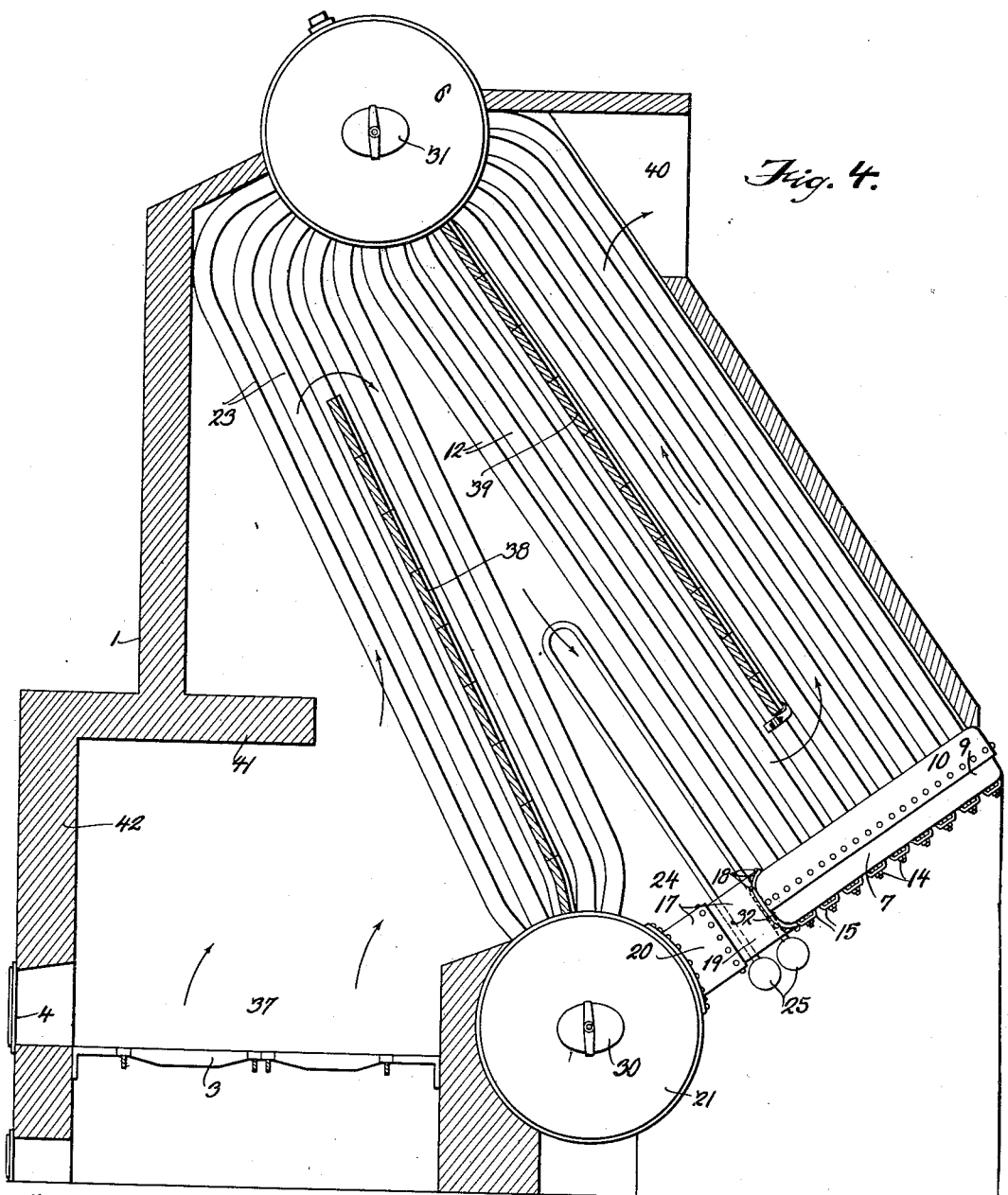

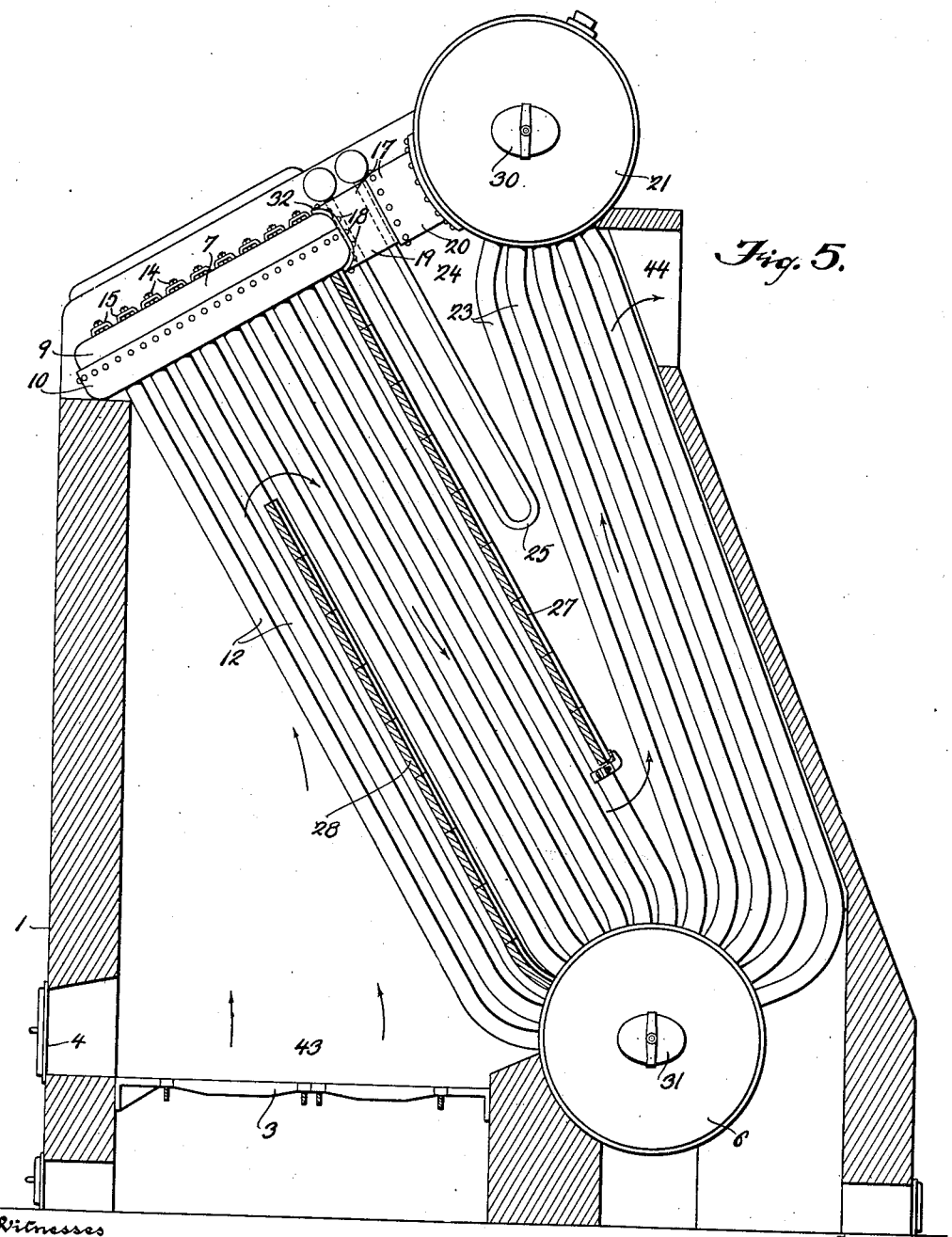

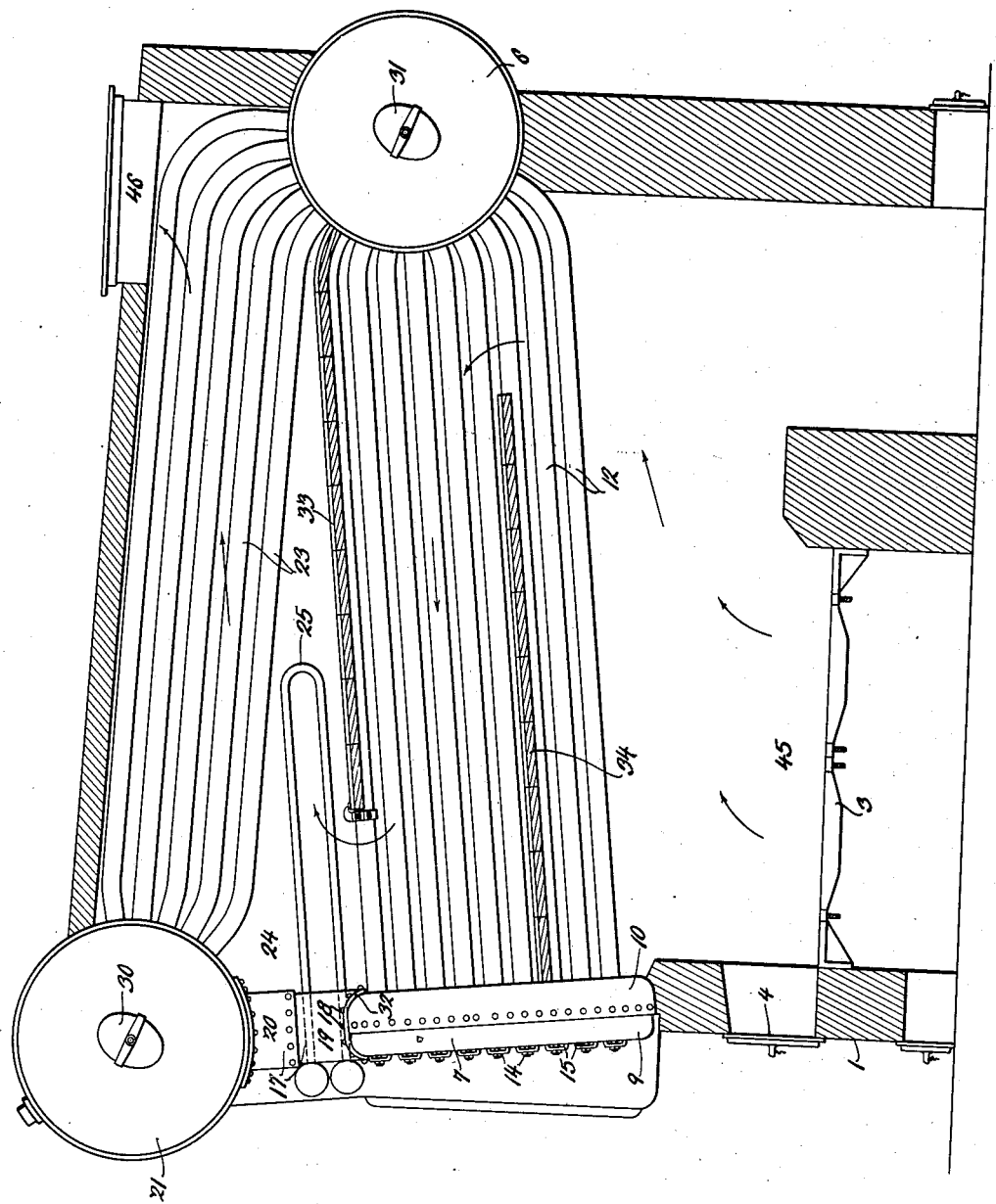

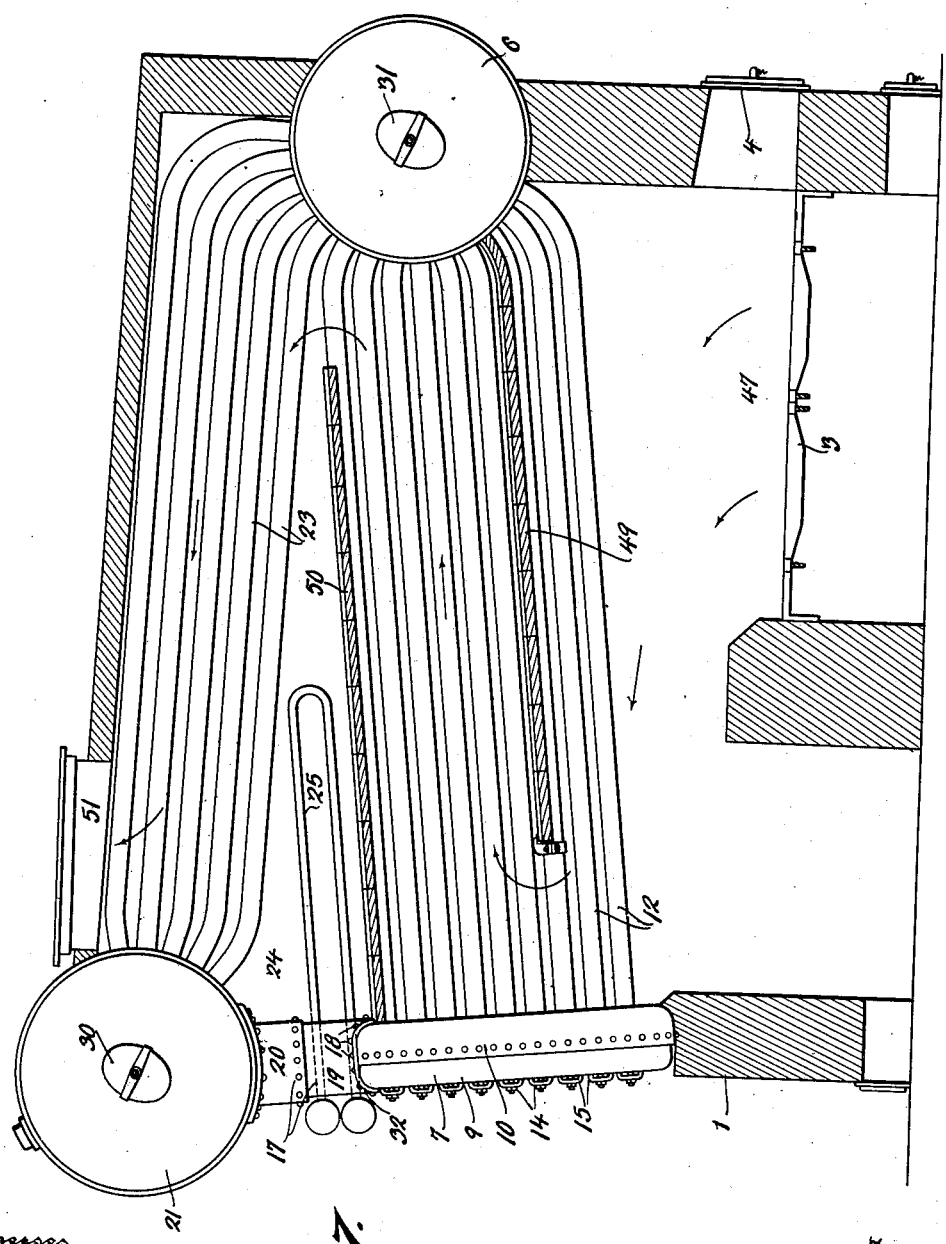

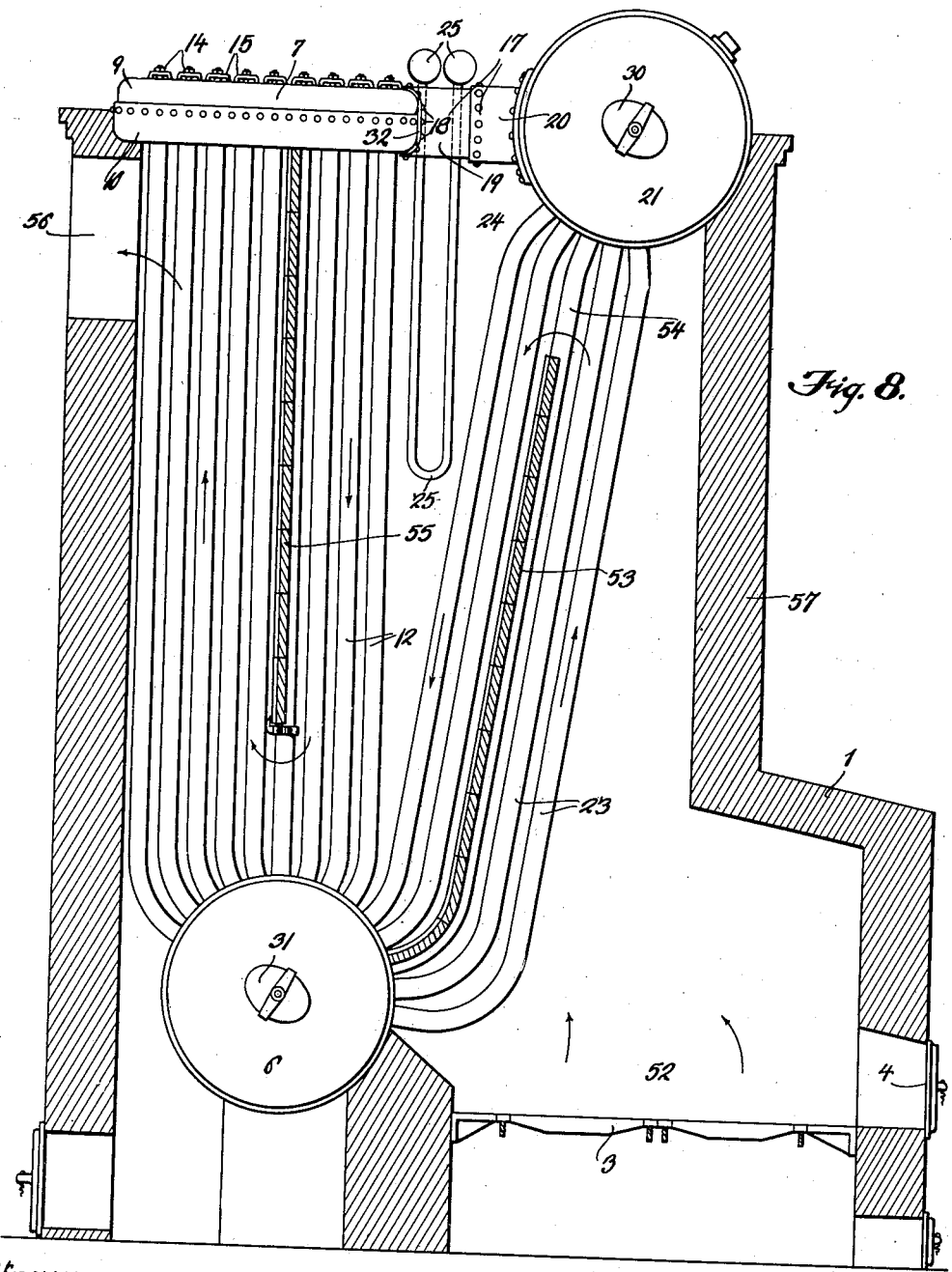

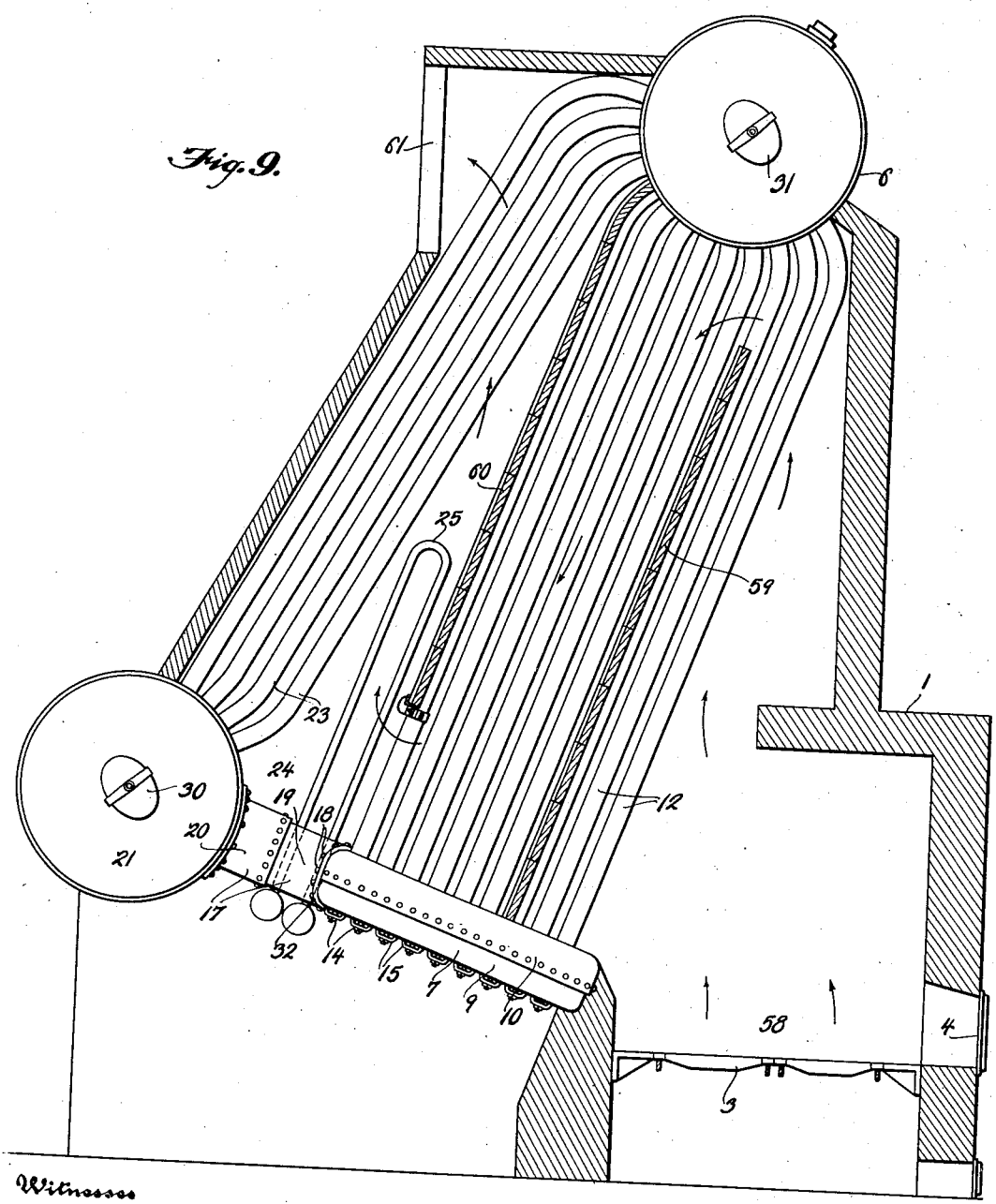

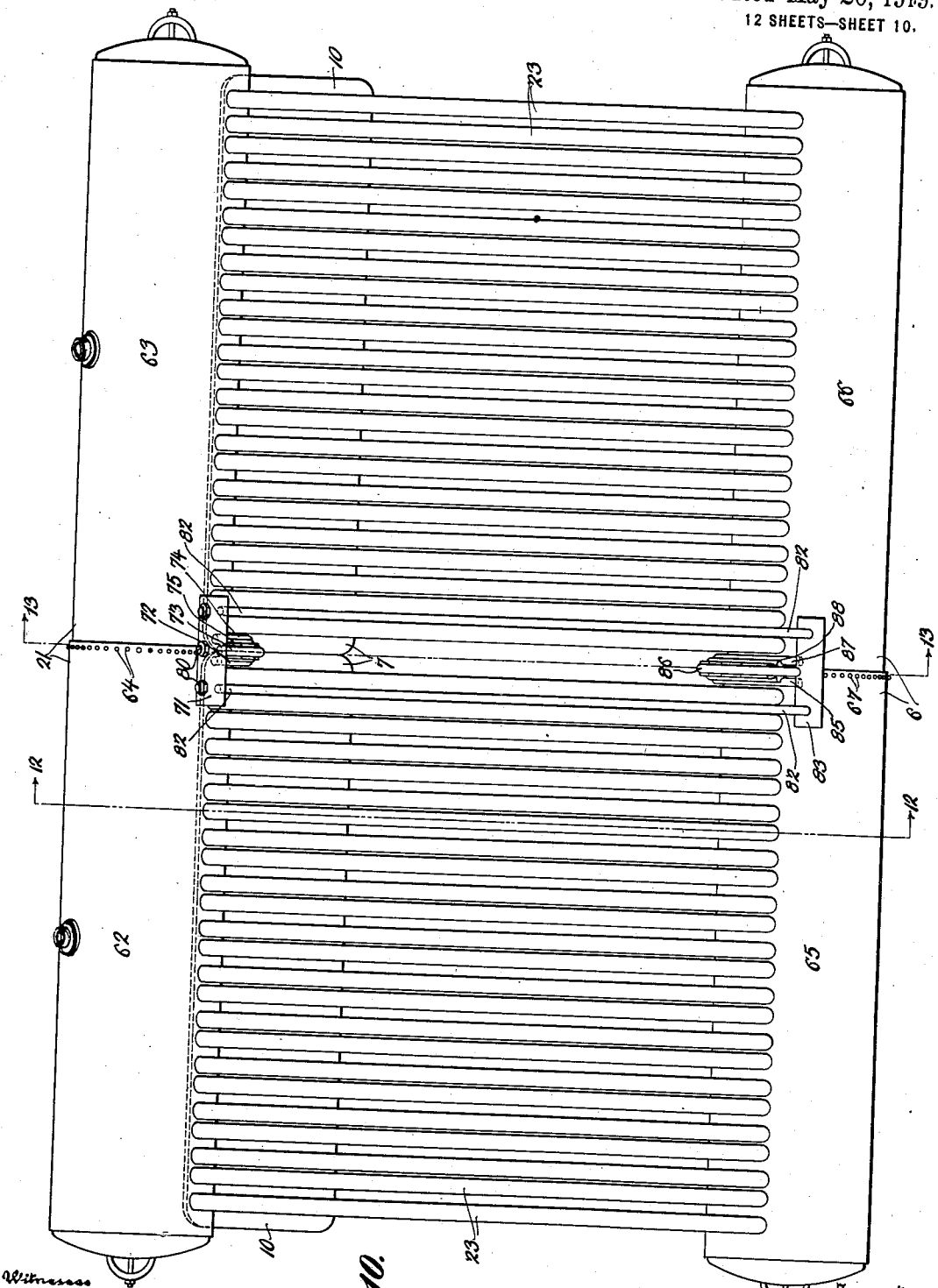

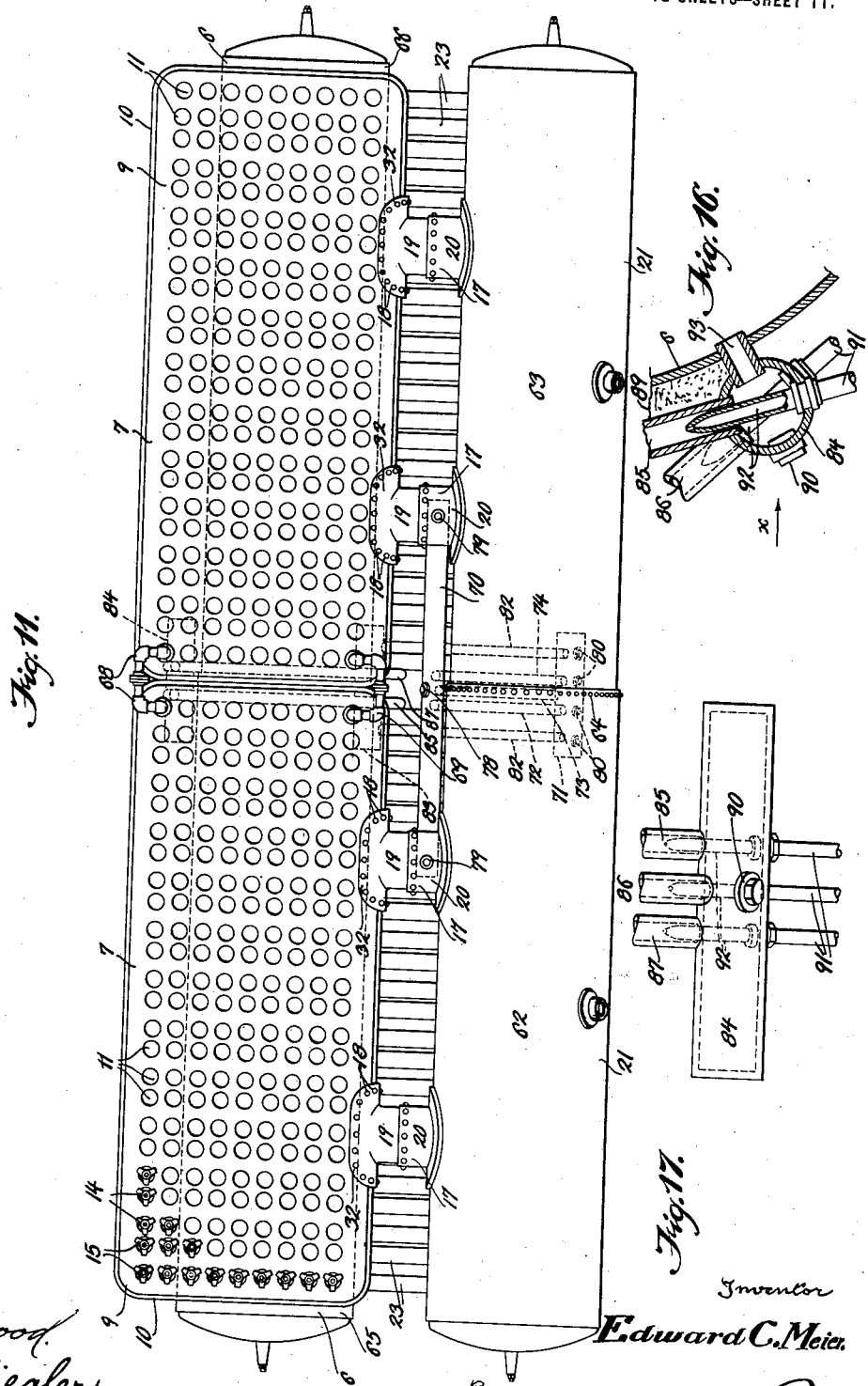

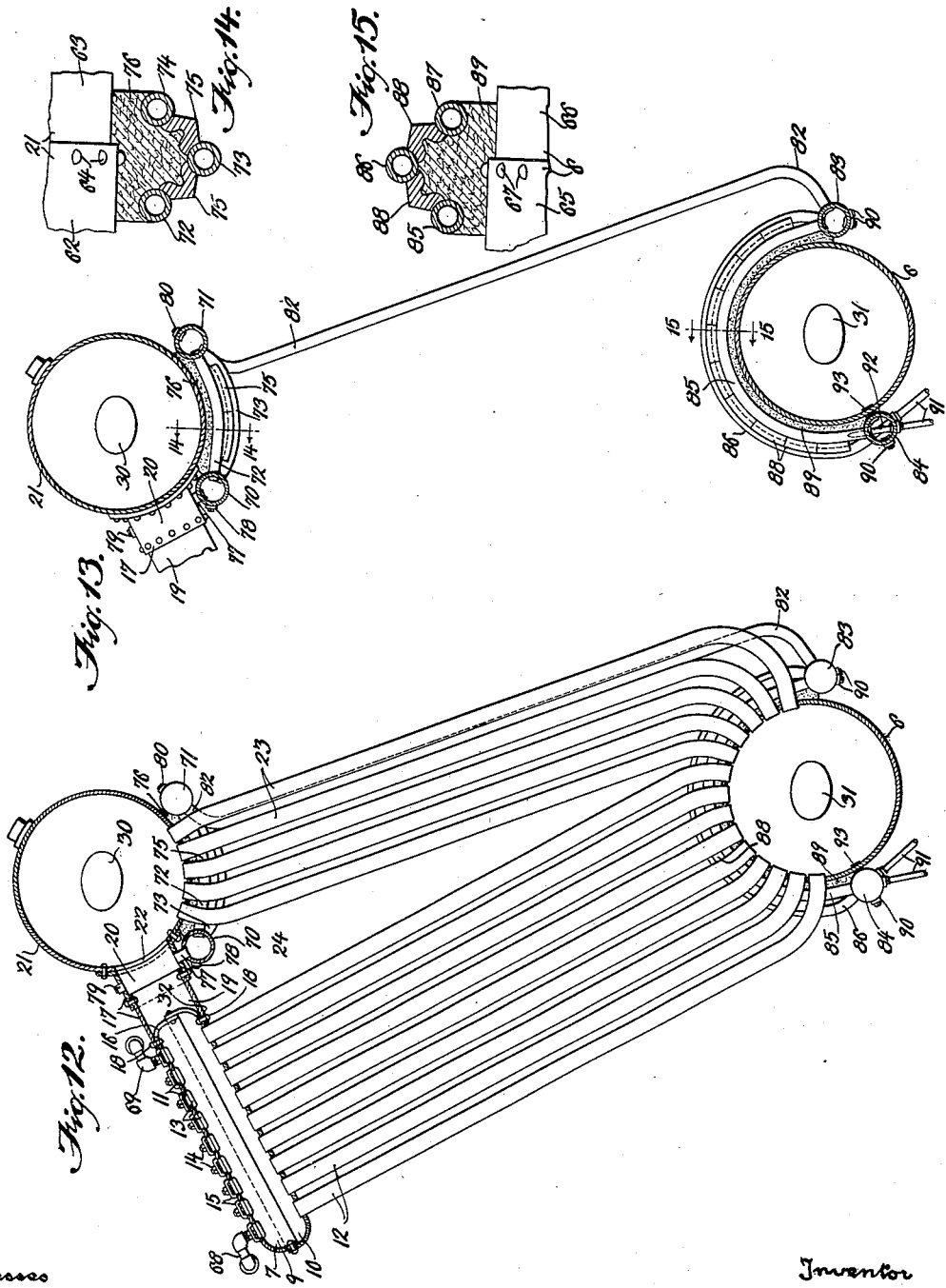

UNITED STATES PATENT OFFICE.

EDWARD C. MEIER, OF PHOENIXVILLE, PENNSYLVANIA; CHARLOTTA I. MEIER, ADMINISTRATRIX OF SAID EDWARD C. MEIER, DECEASED, ASSIGNOR TO HEINE SAFETY BOILER COMPANY, OF PHOENIXVILLE, PENNSYLVANIA, A CORPORATION OF MISSOURI.

CONVERTIBLE BOILER.

1,304,499.      Specification of Letters Patent.      Patented May 20, 1919.

Application filed April 25, 1917. Serial No. 164,414.

*To all whom it may concern:*

Be it known that I, EDWARD C. MEIER, a citizen of the United States, residing at Phœnixville, in the county of Chester and State of Pennsylvania, have invented certain new and useful Improvements in Convertible Boilers, of which the following is a specification.

My invention consists of an improved convertible boiler. One object of my invention is to provide a boiler in which the parts for containing the water and steam will be so arranged and connected that they can be bodily set in various positions and will efficiently operate when in said various positions to generate steam for the purpose desired.

Another object is to so construct the above mentioned connected parts of my improved boiler that they will be particularly adapted for use in marine work where the character and size of the provided boiler space often varies, thus ordinarily rendering difficult the installation of boilers.

Another object is to so construct my boiler that it can be quickly and easily made in units which are coupled together in such manner that the capacity of the boiler can be readily increased.

A further object is to so make my improved boiler that in any of its various settings it will require a minimum amount of cubical space per horse power, thus rendering it especially desirable for marine work as above mentioned or for stationary work where only a small space is available.

A still further object of my invention is to provide protective means whereby sectional drums, in which the ends of the sections are joined together by rows of rivets, may be safely used when it is desired to increase the capacity of the boiler as above mentioned.

Another object is to so construct said protective means that it will include means whereby the feed water to the boiler is heated prior to its entrance into the boiler proper, and the circulation of the water through the preheating elements is insured even though the feed water pump is stopped, thus insuring against the burning out of the feed water conduits.

These objects, and other advantageous ends which will be described hereinafter, I attain in the following manner, reference being had to the accompanying drawings in which—

Fig. 2 is a sectional end elevation taken on the line 2—2 of Fig. 1, the outer end being shown in outside view.

Figure 1:
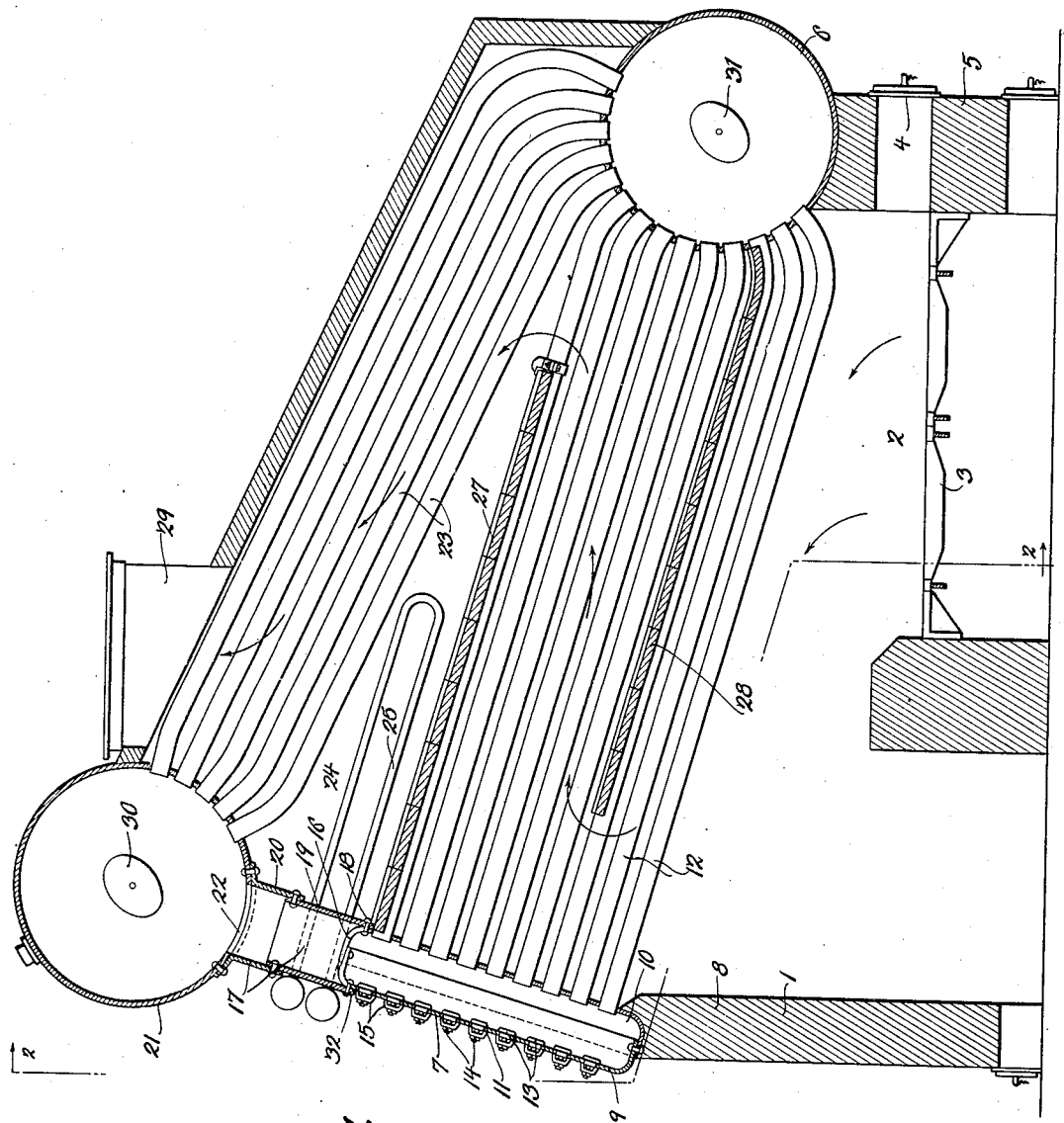
Figure 1 is a longitudinal sectional elevation of my improved boiler showing it mounted in one of its possible settings.

Figs. 3 to 9 inclusive show various forms of possible settings for my improved boiler, the casings providing the settings being shown in section in each instance.

Fig. 10 is a front elevation showing two units of my improved boiler joined together, the casing for the boiler being omitted.

Fig. 11 is a top plan view of Fig. 10.

Fig. 12 is a section on the line 12—12 of Fig. 10.

Fig. 13 is a section on the line 13—13 of Fig. 10, the water tubes which connect the drums being omitted in order to clearly illustrate the protective means for the joint of the drum sections, and the feed water means which forms a part of the protective means.

Fig. 14 is an enlarged fragmentary section on the line 14—14 of Fig. 13.

Fig. 15 is an enlarged fragmentary section on the line 15—15 of Fig. 13.

Fig. 16 is an enlarged section of the water inducing portion of my improved boiler.

Fig. 17 is a side view looking in the direction of the arrow "*x*" on Fig. 16.

Referring to Figs. 1 and 2, the boiler setting includes a casing 1 having a furnace 2 therein including a grate 3 and a firing door 4, the latter being provided in a wall 5 which supports a cross drum 6 forming a part of my improved boiler.

An elongated box header 7 which is substantially rectangular as shown in Fig. 2, rests upon the wall 8 of the casing 1. The header 7 is made in two telescopic sections 9 and 10. The outer section 9 fits within the section 10 so that the seam between these two sections appears on the outside of the casing 1, so that it can be readily calked.

Hand holes 11 are provided in the section 9 and register or are in alinement with tubes 12 which enter the box header through the section 10, these tubes also connecting with the cross drum 6 as clearly shown in Fig. 1. The hand holes 11 are, during the operation of the boiler, closed by hand hole plates 13 which can be readily removed by the removal of the nuts 14 which bear against the yokes 15, the latter being in engagement with the outer surface of the section 9.

The box header 7 has openings 16 and leading from these openings I provide necks 17. These necks are secured to the box header 7 by rivets 18 and the portion of the necks 17 which connect with the box header are secured to the outer surfaces of the sections 9 and 10, thus providing a wide opening into the necks 17. The necks 17 are each preferably made in two sections 19 and 20, the sections 20 being secured to another cross drum 21, the cross drum 21 having openings 22 in register with the passage provided by the sections 20 of the necks 17. The necks thus form a strong connection between the box header and the cross drum 21 so that in addition to providing a passage of large cross sectional area between the box header and the drum, the necks 17 also provide a rigid connecting structure capable of supporting the weight of the parts which they connect. This is an important feature of my improved boiler since, as will hereinafter be more clearly described, the boiler is set in various positions which naturally require durable and strong connecting means for the several parts.

The cross drum 21 has tubes 23 which connect it with the cross drum 6, the space 24 formed between the tubes 23 and the tubes 12 being sufficient to include an elongated superheater 25 which extends through the upper portion 26 of the front wall of the casing 1 and between the necks 17.

Baffles 27 and 28 are provided on the tubes 12 to cause the products of combustion from the furnace 2 to pass upwardly and forwardly into engagement with the tubes, box header, and drums in the directions of the arrows shown in Fig. 1.

An outlet 29 is provided for the products of combustion after they have passed between the tubes 23. Circulation is thus provided, the tubes 12 receiving the initial heat and the water will flow upwardly therethrough into the box header and then freely through wide necks 17 into the cross drum 21. The circulation will thus be set up within the boiler.

Manholes 30 and 31 are provided in the cross drums 21 and 6 so that the tubes can be readily cleaned and furthermore the tubes 12 can be readily removed through the hand holes 11 by the removal of the hand hole plates 13 in a manner above described.

It will be noted that the sections 19 of the necks 17 have flanges 32 (see Fig. 2) which are secured to the outer surface of the box header 7 so as to provide additional reinforcing, and at the same time provide a neat intersection between the section 19 and the box header.

In the form of my invention shown in Fig. 3, I have shown substantially the same setting for the boiler as illustrated in Fig. 1 with the exception that the furnace is arranged adjacent the wall 8 and the baffles 33 and 34 which correspond with the baffles 27 and 28 above noted, are shifted longitudinally so that the products of combustion from the furnace 35 are compelled to pass downwardly under the baffle 34 toward the drum 6 prior to ascending through the passage provided between the baffles 33 and 34. Thus, if the space in which the boiler is to be set is such that it would be impossible, for example, to fire the boiler from the end shown in Fig. 1 it is possible to fire the boiler from the opposite end through the wall 8 as shown in Fig. 3, it merely being necessary to slightly shift the position of the grate 3 in Fig. 1 and to move the baffles into the position shown in Fig. 3 and to provide the outlet opening 36 above the drum 6 instead of adjacent the drum 30 as shown in Fig. 1. In all other respects the elements shown in Fig. 3 are similar to that described in connection with Figs. 1 and 2, and I have therefore given similar parts corresponding reference numerals.

In Fig. 4, I have shown my improved boiler set in an upright position and fired and baffled so that the sections of tubes running from the drum 21 to the drum 6 receive the direct heat from the products of combustion after leaving the furnace 37, the products passing upwardly into engagement with the tubes 23 which are directly adjacent the furnace and forward of a baffle 38 which leads upwardly from the drum 21 and stops short of the drum 6, it being noted that this baffle 38 instead of being provided adjacent the tubes 12 as the upper baffle in Figs. 1 and 3, is arranged so as to deflect the products of combustion upwardly into engagement with the drum 6.

Another baffle 39 is provided between the tubes 12 in Fig. 4 and extends downwardly from the drum 6, stopping short of the box header 7. The outlet 40 for the products of combustion is provided at the top of the boiler setting so that the products of combustion are caused to take the path provided by the baffles 38, 39, and the walls of the boiler casing.

In this construction I preferably provide an extension 41 on the boiler casing 42 which deflects and confines the products of combustion directly adjacent the forward tubes 23. In all other respects the construction and elements are similar to those described in connection with Figs. 1 and 2, and I have therefore given similar parts corresponding reference numerals.

Fig. 5 shows another arrangement of upright setting of my improved boiler in which the tubes 12 receive the initial heat from the products of combustion passing upwardly from the furnace 43. In this form of setting, the baffles are arranged in the same manner as described in connection with Fig. 1, the only difference being that the outlet opening 44 for the products of combustion extends at a slightly different angle than that of the outlet opening 29 as shown in Fig. 1. In all other respects the construction is similar to Fig. 1, and I have therefore given similar parts corresponding reference numerals.

In Fig. 6, I have shown a different arrangement of setting for my improved boiler in which the box header is below the drum 6 and the tubes 12 slant upwardly thereto. The furnace 45 is mounted below the lower tubes 12 adjacent the box header and the arrangement of the baffles is similar to that shown in Fig. 3, and I have therefore given the baffles the same reference numerals as illustrated in Fig. 3. In this form of setting, the products of combustion after engaging the tubes 12 which are below the baffle 34, pass upwardly toward the drum 6 and then between the baffles 34 and 33, thus again the tubes 12 receive the initial heat from the products of combustion, and after heating the other elements of the boiler, pass outwardly through the opening 46. The arrows indicate the path followed by the products of combustion during their progress through the boiler.

In all other respects the construction is similar to that described in connection with Fig. 1, and I have therefore given similar parts correspondingly reference numerals.

Fig. 7 shows the same form of boiler setting as illustrated in Fig. 6, with the exception that the furnace 47 is located adjacent the opposite wall and to that in which the furnace 45 is located as illustrated in Fig. 6 and the firing door 48 permits the firing of the boiler at the opposite end from that illustrated in Fig. 6.

The baffles 49 and 50 have the same relation to the box header 7 and to the drum 6 as they do in Fig. 1 with the exception that they are slanting in an opposite direction, so that the products of combustion from the furnace 47 pass forwardly and initially engage the lower tubes 12, and after they have passed around the left hand end of the baffle 49, pass between the baffles 49 and 50 and eventually pass outwardly through the opening 51.

In all other respects the parts of the boiler are similar to that described in connection with Fig. 1, and I have given similar parts corresponding reference numerals.

Fig. 8 shows another arrangement of upright setting for my improved boiler in which the tubes 12 extend substantially vertical and the furnace 52 is located so that the products of combustion initially engage the tubes 23 which extend between the drums 6 and 21.

A baffle 53 is arranged between the tubes 23 and extends upwardly from the drum 6 and stops short of the drum 21 to provide a passage 54 for the products of combustion as they pass rearwardly into engagement with the tubes 12 which are located between the baffle 53 and a baffle 55 which is positioned between the tubes 12 and extends downwardly from the box header 7, stopping short of the drum 6.

An outlet passage 56 is provided for the products of combustion after passing upwardly to the rear of the baffle 55. In this construction, it will be noted that the box header 7 and drum 21 are positioned at the top of the casing 57.

In Fig. 9, I have shown another upright setting for my improved boiler in which a furnace 58 is provided to initially heat the tubes 12. A baffle 59 is positioned between the tubes 12 and a baffle 60 is arranged between the tubes 12 and the tubes 23, the arrangement of the baffles being substantially identical to that shown in Figs. 3 and 6. In this arrangement, the box header 7 and drum 21 are positioned below the drum 6 and the tubes 23 and 12 incline upwardly toward the drum 6 and toward a plane extending vertically through the furnace 58. The products of combustion after passing upwardly from the furnace 58, engage the tubes 12 which are arranged forward of the baffle 59 and then after they have passed between the upper end of the baffle 59 and the drum 6, pass downwardly between the baffles 59 and 60, then under the baffle 60 and upwardly between the tubes 23 to the outlet passage 61.

In each of the forms of my invention described above, the boiler can, with very little change in the formation of the casing, be adapted for various positions and to fill various shapes and sizes of spaces without requiring any change in the formation of the boiler proper.

Furthermore, it will be noted that in each instance the box header is exposed to the atmosphere outside of the boiler casing but is not covered by the casing. This permits the ready removal of the tubes 12 in case of repair or replacement, and the tubes which connect the drums 6 and 21 can be taken care of through the medium of said drums, since it is possible for a man to enter the drums through the manholes 30 and 31 above described.

Steam outlets may be connected with the steam generating element in each instance according to the setting of the boiler. For example, as shown in Figs. 1, 3, 5, 6, 7, and 8, the drum 21 forms the steam collecting drum while in Figs. 4 and 9 the drum 6 forms the steam collecting drum. In each instance the steam outlet can be connected to the steam connecting drum whether it is the drum 21 or the drum 6.

In Figs. 10 to 16 inclusive, I have illustrated how my improved boiler can be extended to increase its capacity. In this instance I have shown two box headers 7 which are arranged end to end, the rivets which join the sections 9 and 10 of each header having countersunk heads on the abutting edges of the box headers so that the latter can be positioned close together.

The drum 21 is made in two sections 62 and 63 which are joined together by a row of rivets 64. The drum 6 is also made in two sections 65 and 66 which are joined together by a row of rivets 67. Thus, the drums 21 and 6 are doubled in length, the joint between the sections of both the drums 21 and 6 being in alinement with the parting between the box headers 7.

It is expensive and impractical to make drums of this nature of a single length, and prior to my invention it was not considered good policy to make a drum in two or more sections riveted together especially if the joint between the sections was subjected to intense heat. I overcome this difficulty by means hereinafter described, and by so doing am enabled to make my drums in sections riveted together, as above described, with absolute safety, at the same time utilizing means which form a protection for the joints of the drums to also assist in conducting heated feed water to the boiler proper.

In order to balance the pressures between the two box headers illustrated, I provide equalizing couplings 68 and 69 (see Fig. 11) such as are illustrated and claimed in my United States Patent No. 1,220,254 of March 27, 1917.

The means for protecting the seams between the sections 62 and 63 of the boiler 21 and the sections 65 and 66 of the boiler 6 will now be described.

I arrange two short drums 70 and 71 adjacent the lower portion of the drum 21 and connect these two drums with three tubes 72, 73, and 74, it being understood that a greater number of tubes can be used if desired. These tubes are slightly curved throughout their length, and the tube 73 is positioned below the tubes 72 and 74 to form a cradle to receive fire brick tile 75 (see Figs. 13 and 14).

A packing 76, such for example as asbestos or the like, is positioned above the tile 75 and below the lower surface of the drum 21, it being noted that the small drum 70 extends transversely of the seam between the sections 62 and 63 of the drum 21, thus the tubes 72, 73, 74, tile 75, and asbestos packing 76 forms a protective cover for the portion of the seams which receives the hottest portion of the products of combustion.

The tubes 72, 73, and 74, and the drums 70 and 71 also form conduits for the feed water as will hereinafter be more completely described.

The drum 70 communicates with the adjacent necks 17 by coupling pipes 77 (see Figs. 11, 12, and 13) and the drum 70 also has plugged openings 78 whereby the tubes 72, 73, and 74 can be cleaned. The sections 20 of the neck 17 also have plugged openings 79 which are in direct alinement with the coupling pipes 77, so that by removing the plugs of the openings 79, said pipes 77 can be readily cleaned. The drum 71 also has plugged openings 80 through which the pipes 72, 73, and 74 can be cleaned if desired.

Two tubes 82 connect the small drum 71 with a similar drum 83 arranged adjacent the drum 6 and which extends across the connecting seam between the sections 65 and 66 of said drum 6.

Another short drum 84 on the opposite side of the drum 6 extends transversely across the seam in said latter drum and tubes 85, 86, and 87 connect the drum 83 with the drum 84. These tubes are arranged in the order clearly shown in Fig. 13 and in the cross section in Fig. 15, and substantially conform throughout their length to the curvature of the drum 6.

Fire brick tile 88 is set between these tubes and a packing 89 of asbestos or the like are arranged between the tubes. the tile and the seamed surface of the drum 6, so that they serve to act as an insulator for the drum 6 at the connecting seam in a manner similar to the tubes 72, 73, 74, tiles 75, and packing 76 above described in connection with the drum 21.

Plugged holes 90 are provided in the drums 83 and 84 whereby the tubes 85, 86, and 87 can be readily cleaned when the plugs are removed. Feed water pipes 91 enter the drum 84 and are provided with nozzles 92 such for example as illustrated in my Patent No. 1,220,254 of March 27, 1917, above mentioned, so that the water entering through the pipes 91 is injected through tubes 85, 86, and 87 and cause a circulation therethrough and through the tubes 82, pipes 72, 73, and 74 to the drum 70 and from thence into the water legs 17 through the pipes 77.

It will be noted that if desired instead of entering the feed water pipes 91 in the drum 84, they may be caused to enter the drum 71, and I preferably connect the drum 84 with the drum 6 by a coupling pipe 93.

The tubes 85, 86, and 87 and the tubes 72, 73, and 74 serve in three capacities. First, they assist in supporting the fire brick tile and the asbestos packing. Second, they serve as preheating elements for the boiler proper, and third, they act as efficient protective means since by conveying the cool water they reduce the temperature at the seams in the drums 6 and 21. The flow of water therethrough which is injected by the nozzles 92 prevents the burning out of the tubes in case the injecting pump is shut down, since sufficient circulation will be set up within the pipes to prevent their burning out.

Thus, in my present invention, I have provided a boiler which is extremely efficient in its action and which can be readily changed in position to accommodate itself to various sizes and shapes of boiler spaces. Furthermore, my invention is of particular value for the reason that its capacity can be readily increased at a low cost and when increased will require but a minimum amount of space, since practically no space will be lost by joining the units together as above described. Also, the cost of production of this boiler when an increased horse power is desired is comparatively low since short boiler sections can be used with safety.

All of the above advantageous features render my improved boiler of particular advantage for use aboard ships and marine work in general, however, it is also extremely serviceable in its adapability for stationary work.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A convertible boiler comprising two drums, a set of tubes connecting said drums, a box header, a set of tubes connecting said box header with one of said drums, and a neck connecting and secured to the other of said drums and said header to prevent longitudinal movement of said neck with respect to either said latter drum or header, said neck serving as a spacing and supporting means for either said latter drum and its connected tubes or the header and its connected tubes when the boiler is set in various positions in which the said latter drum is above said header or said header is above said latter drum, substantially as described.

2. A convertible boiler comprising two drums, a set of tubes connecting said drums, a box header, a set of tubes connecting said box header with one of said drums, and a plurality of necks connected and secured to the other of said drums and said header to prevent longitudinal movement of said necks with respect to either said latter drum or header, said necks serving as spacing and supporting means for either said latter drum and its connected tubes or the header and its connected tubes when the boiler is set in various positions in which the said latter drum is above said header or said header is above said latter drum, substantially as described.

3. A boiler including a cross drum made in sections and seamed together, tubes extending adjacent to and in the direction of said seamed portion, and means for supplying water to said tubes to keep the latter cool so as to provide a heat-protecting means for said seamed portion of the drum, substantially as described.

4. A boiler including a cross drum made in sections and seamed together, small drums extending across the seamed portion of said first mentioned drum, tubes communicating with said small drums and extending adjacent to and in the direction of said seamed portion, and means for supplying said small drums with water whereby the latter is conveyed through said tubes to keep the latter cool so as to provide a heat-protecting means for said seamed portion of the drum, substantially as described.

5. A boiler including a cross drum made in sections and seamed together, tubes extending adjacent to and in the direction of said seamed portion, means for supplying water to said tubes to keep the latter cool so as to provide a heat-protecting means for said seamed portion of the drum, and means for conducting said water, after it passes through the tubes, into the boiler whereby said tubes serve as a preheater for the feed water, substantially as described.

6. A boiler including a cross drum made in sections and seamed together, tubes extending adjacent to and in the direction of said seamed portion, means for supplying water to said tubes to keep the latter cool so as to provide a heat-protecting means for said seamed portion of the drum, said tubes being spaced apart, and tiles inserted between said tubes and suspended thereby, substantially as described.

7. A boiler including a cross drum made in sections and seamed together, tubes extending adjacent to and in the direction of said seamed portion, means for supplying water to said tubes to keep the latter cool so as to provide a heat-protecting means for said seamed portion of the drum, said tubes being spaced apart, tiles inserted between and suspended by said tubes, and insulating material interposed between said tiles and tubes and the seamed portion of the drum, substantially as described.

8. A boiler including two cross drums made in sections and seamed together, two sets of tubes extending respectively adjacent to and in the direction of the seamed portions of each of said cross drums, means forming a conduit between the tubes of each set, and means for supplying water to the tubes of one set whereby said water, after passing through the tubes of said latter mentioned set, passes through said conduit to the tubes of the other set, substantially as described.

9. A boiler including two cross drums made in sections and seamed together, two sets of tubes extending respectively adjacent to and in the direction of the seamed portions of each of said cross drums, means forming a conduit between the tubes of each set, means for supplying water to the tubes of one set whereby said water, after passing through the tubes of said latter mentioned set, passes through said conduit to the tubes of the other set, and means for conducting the water, after it passes through the tubes of said latter set, into the boiler, substantially as described.

10. A boiler including a cross drum made in sections and seamed together, tubes extending adjacent to and in the direction of said seamed portion, means for supplying water to said tubes to keep the latter cool so as to provide a heat-protecting means for said seamed portion of the drum, and insulating means supported by said tubes and interposed between the latter and the seamed portion of the boiler, substantially as described.

11. A boiler including a cross drum made in sections and seamed together, a header, a neck communicating with the header and the cross drum, tubes extending adjacent to and in the direction of said seamed portion, means for supplying water to said tubes to keep the latter cool so as to provide a heat-protecting means for said seamed portion of the drum, and means communicating with said tubes and said neck whereby water, after passing through said tubes, enters the neck, substantially as described.

In testimony whereof I have signed my name to this specification in the presence of two subscribing witnesses.

EDWARD C. MEIER.

Witnesses:
CHAS. E. POTTS,
MARY A. INGLAR.

Copies of this patent may be obtained for five cents each, by addressing the "Commissioner of Patents, Washington, D. C."